United States Patent
Sandick et al.

(10) Patent No.: US 6,684,241 B1
(45) Date of Patent: Jan. 27, 2004

(54) APPARATUS AND METHOD OF CONFIGURING A NETWORK DEVICE

(75) Inventors: Haldon J. Sandick, Durham, NC (US); Kedarnath Poduri, Santa Clara, CA (US); Matthew B. Squire, Raleigh, NC (US)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/408,380

(22) Filed: Sep. 29, 1999

(51) Int. Cl.$^7$ .............................. G06F 15/177
(52) U.S. Cl. ............... 709/220; 709/224; 709/227; 709/238; 370/254
(58) Field of Search ................. 709/220, 224, 709/227, 238, 244, 245; 370/389, 401, 254, 229

(56) References Cited

U.S. PATENT DOCUMENTS

| | | | |
|---|---|---|---|
| 5,557,748 A | 9/1996 | Norris | 395/200.1 |
| 5,708,778 A | 1/1998 | Monot | 395/200.1 |
| 5,717,853 A | * 2/1998 | Deshpande et al. | 709/209 |
| 5,838,907 A | 11/1998 | Hansen | 395/200.5 |
| 5,867,706 A | 2/1999 | Martin et al. | |
| 5,913,921 A | * 6/1999 | Tosey et al. | 709/220 |
| 5,940,376 A | 8/1999 | Yanacek et al. | 370/250 |
| 5,963,540 A | 10/1999 | Bhaskaran | 370/218 |
| 5,999,948 A | 12/1999 | Nelson et al. | 707/506 |
| 6,012,088 A | 1/2000 | Li et al. | 709/219 |
| 6,047,325 A | 4/2000 | Jain et al. | 709/227 |
| 6,070,187 A | * 5/2000 | Subramaniam et al. | 709/220 |
| 6,091,732 A | * 7/2000 | Alexander et al. | 370/389 |
| 6,098,097 A | 8/2000 | Dean et al. | 709/220 |
| 6,175,865 B1 | 1/2001 | Dove et al. | 709/220 |
| 6,256,314 B1 | * 7/2001 | Rodrig et al. | 370/401 |
| 6,263,387 B1 | 7/2001 | Chrabaszcz | 710/103 |
| 6,282,201 B1 | * 8/2001 | Alexander et al. | 370/389 |
| 6,286,038 B1 | 9/2001 | Reichmeyer et al. | 709/220 |

OTHER PUBLICATIONS

Fuller. V., et al.; "Classless Inter–Domain Routing 9CIDR): and Address Assignment and Aggregation Strategy"; ftp://ftp.isi.edu/in–notes/rfc1516: Network Working Group; p. 1.
http://www.faqs.org/rfcs/ Network Working Group RFC# 1583, J. Moy, Mar. 1994 pp. 1–156.
http://www.faqs.org/rfcs/ Network Working Group RFC# 2453, G. Malkin, Nov. 1998 pp. 1–30.
htttp://www.faqs.org/rfcs/ Network Working Group RFC#2338, S. Knight, Apr.–1998, pp. 1–22.
http://www.faqs.org/rfcs/ Network Working group RFC # 1240, C. Shue, Jun.–1991 pp. 1–7.
http://www.faqs.org/rfcs/ Network Working group RFC# 1885, S. Deering, Dec. 1995, pp. 1–13.
Haritsa J. et al., "Mandate: Managing Networks Using Database Technology", IEEE Journal on Selected Areas in Communications, IEEE Inc. New York, US, vol. 11, Nr. 9, pp. 1360–1372, 12/93.
"TCP/IP Illustrated", vol. I, The Protocols, W. Richard Stevens, 1994, pp. 62–63.
"ICMP Router Discovery Messages," Network Working Group, S. Deering, Sep. 1991.

* cited by examiner

Primary Examiner—Frantz B Jean
(74) Attorney, Agent, or Firm—Kevin L. Smith

(57) ABSTRACT

An apparatus and method of configuring a first network device that is a part of a subnet ascertains configuration data from packets in a subnet having configuration dat. More particularly, the packets, which are transmitted by a second network device in the subnet, first are retrieved and then parsed to ascertain the configuration data. At least a portion of the configuration data is stored in a configuration database. In addition, at least one datum from the configuration data is processed to produce additional configuration data that also is stored in the configuration database. The first network device consequently operates in accord with the data in the configuration database.

39 Claims, 3 Drawing Sheets

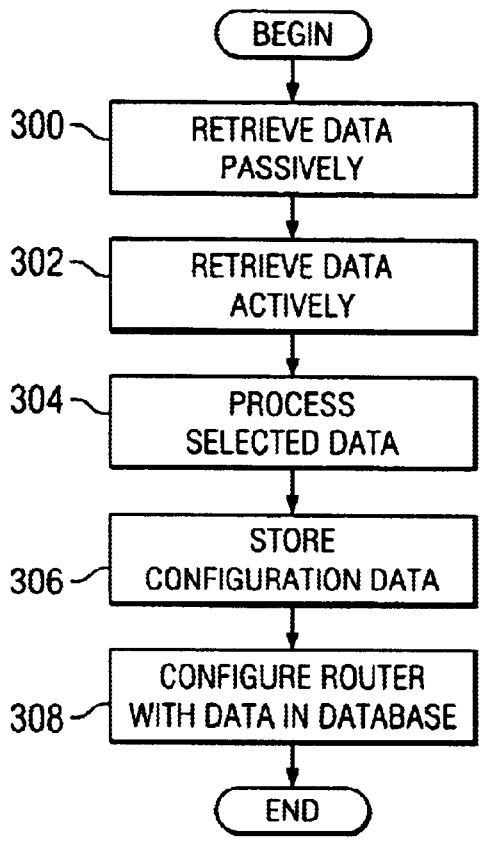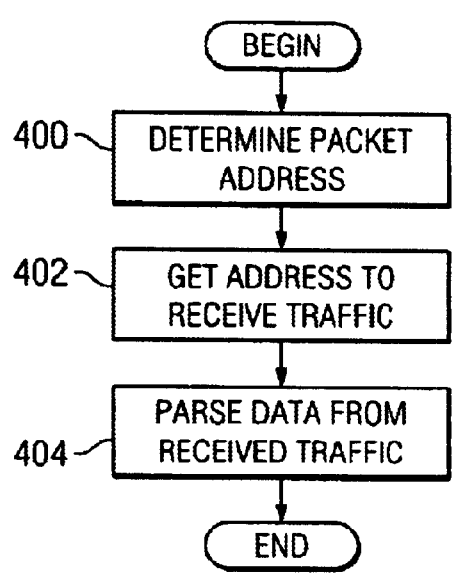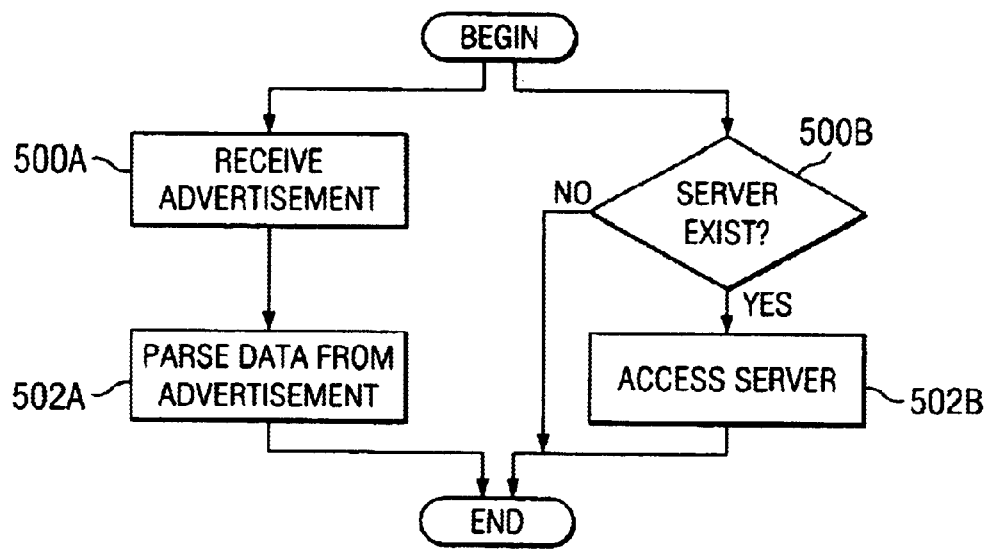

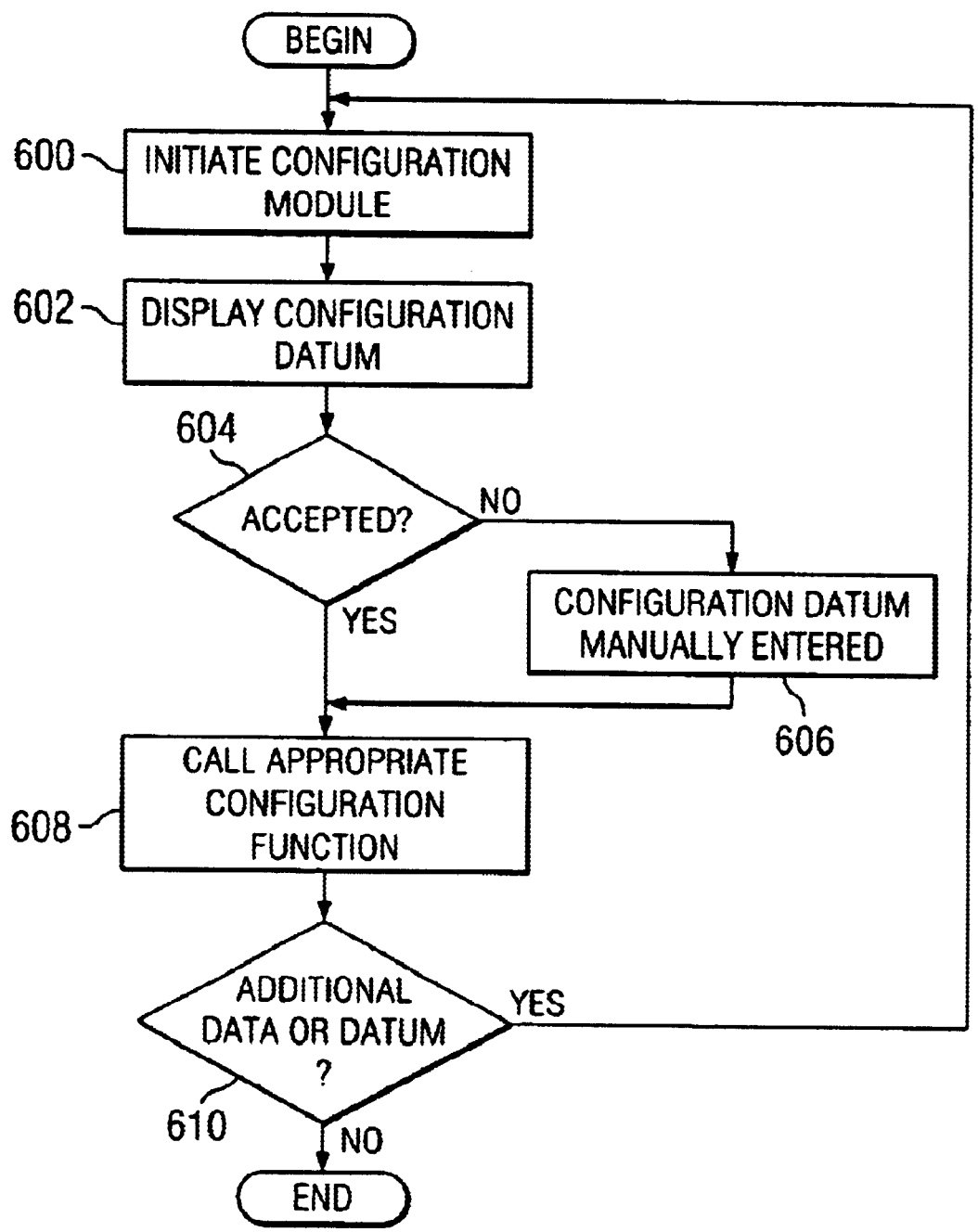

APPARATUS AND METHOD OF CONFIGURING A NETWORK DEVICE

CROSS REFERENCE TO RELATED APPLICATIONS

U.S. patent application entitled, "SYSTEM, DEVICE, AND METHOD FOR DETERMINING A PROTOCOL ADDRESS AND SUBNET MASK FOR A NETWORK DEVICE IN A COMMUNICATION NETWORK", filed on even date herewith and identified by U.S. application Ser. No. 09/408,386, the disclosure of which is incorporated herein, in its entirety, by reference; and U.S. patent application entitled, "METHODS FOR AUTO-CONFIGURING A ROUTER ON AN IP SUBNET", filed on even date herewith and identified by U.S. application Ser. No. 09/407,915, the disclosure of which is incorporated herein, in its entirety, by reference.

FIELD OF THE INVENTION

The invention generally relates to networks and, more particularly, the invention relates to configuring a network device that is a member of a subnet.

BACKGROUND OF THE INVENTION

The task of configuring network devices is becoming increasingly burdensome on overworked computer administrative staffs. As the size of individual networks grow, the complexity of their configuration and management increases. Moreover, with the addition of new networks, new protocols, and new services, the already difficult task of configuring and managing a network can become overwhelming.

The difficulties of network management arise from many sources. First, configuring a network device is a labor intensive process that requires training. Specifically, current configuration methods require an administrator to initiate and perform the actual configuration before the network device can become a functional part of the network. In addition, when a network device must be reconfigured due to network growth or change, an administrator again must be personally involved to execute the reconfiguration process.

Second, configuration is more complicated in the current multi-vendor network environment where there is no single standard configuration method for every network device. Specifically, there are many possible ways to configure network devices, such as by using SNMP, command line interfaces, and configuration files using FTP. In fact, the preferred method of configuring a single type of network device frequently varies from vendor to vendor. Recently, this problem has become worse by the increased number of acquisitions in the network industry. For example, an acquired company's products often are configured differently than its acquiring vendor's existing products. Accordingly, even within a single vendor's product line, it often is necessary to support multiple configuration methods.

Finally, the process of configuring a network device is prone to error and difficult to debug. While some configuration tools are beginning to become available, most currently available tools do little or no semantic and/or consistency checking between related configuration options. As a consequence, overworked and understaffed network administration departments often perform the error and consistency checking.

SUMMARY OF THE INVENTION

In accordance with one aspect of the invention, an apparatus and method of configuring a first network device that is a part of a subnet ascertains configuration data from packets in a subnet having configuration data. More particularly, the packets, which are transmitted by a second network device in the subnet, first are retrieved and then parsed to ascertain the configuration data. At least a portion of the configuration data is stored in a configuration database. In addition, at least one datum from the configuration data is utilized to produce additional configuration data that also is stored in the configuration database. The first network device consequently operates in accord with the data in the configuration database.

In preferred embodiments, the subnet is a local area network having a plurality of other network devices in addition to the second network device. The retrieved packets may be transmitted in accord with an inter-router protocol, and may be control packets or data packets. Instead of or in addition to message data, the retrieved packets also may have configuration data relating to the inter-router protocol. The retrieved packets may have a destination field with a destination address. Accordingly, the first network device sets an interface to have the destination address and/or port number. The subnet may be coupled with a network.

In accordance with another aspect of the invention, an apparatus and method of configuring a first network device that is a part of a subnet first retrieves packets with configuration data. The retrieved packets are transmitted by a second network device that also is a part of the subnet. The retrieved packets are parsed to ascertain the configuration data, at least one datum of which being utilized to produce additional configuration data. The configuration data and additional configuration data are utilized to control the operation of the first network device.

In accordance with still another aspect of the invention, a method of configuring a first network device that is a part of a subnet first transmits packets having configuration data from a second network device to the first network device. In preferred embodiments, the second network device is a member of the subnet. The packet traffic in the subnet is monitored to retrieve the packets. The retrieved packets then are parsed to ascertain the configuration data. At least a portion of the configuration data parsed from the retrieved packets is stored in a configuration database. At least one datum of the configuration data is utilized to produce additional configuration data, which also is stored in the configuration database. The first network device therefore operates in accord with the data in the configuration database.

Preferred embodiments of the invention are implemented as a computer program product having a computer usable medium with computer readable program code thereon. The computer readable code may be read and utilized by the computer system in accordance with conventional processes.

BRIEF DESCRIPTION OF THE DRAWINGS

The foregoing and advantages of the invention will be appreciated more fully from the following further description thereof with reference to the accompanying drawings wherein:

FIG. 3 shows a preferred process of configuring a given router that is added to a given subnet.

FIG. 4 shows a preferred process of passively retrieving configuration data from monitored packet traffic.

FIG. 5 shows a preferred process of actively retrieving configuration data relating to a given subnet shown in FIG. 1.

FIG. 6 shows a preferred process of configuring a given router based upon configuration data in a configuration database.

DESCRIPTION OF PREFERRED EMBODIMENTS

Figure 1:
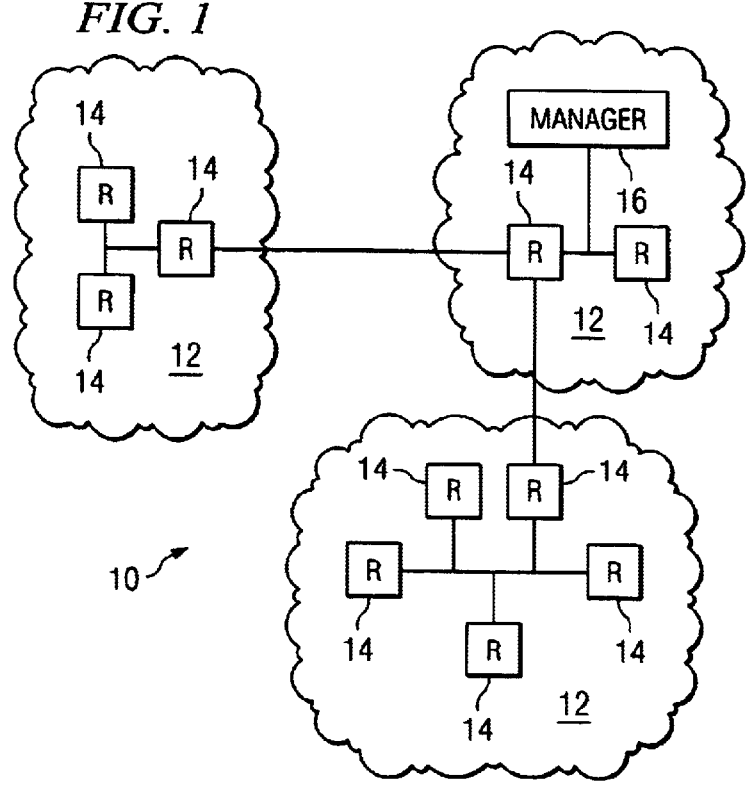
FIG. 1 schematically shows an exemplary network arrangement in which preferred embodiments of the invention may be implemented.

FIG. 1 schematically shows an exemplary network 10 in which preferred embodiments of the invention may be implemented. More particularly, the network 10 includes a plurality of interconnected subnets 12 that each include one or more routers 14. Each subnet 12, for example, may be a local area network interconnecting a plurality of client computers (not shown) via their respective routers 14. The network 10 also includes a network manager server ("manager server 16") for use by a network administrator to manage the operation of the network 10. Although not shown, the network 10 may be in communication with other networks, such as the Internet.

The routers 14 may be any conventional router, such as an ACCELAR™ router (manufactured by Nortel Networks Corporation of Montreal, Quebec, Canada) that includes the logic described herein to be self-configuring. In accordance with preferred embodiments of the invention and as discussed in greater detail below, each router 14 therefore is capable of monitoring traffic in its local subnet 12 and, based upon the monitored traffic, configuring itself to successfully communicate with the other routers 14. In some embodiments, a given router 14 may be a member of more than one subnet 12. The manager server 16 may be any server configured to administer a network with a network configuration system, such as the OPTIVITY™ network configuration system, also available from Nortel Networks Corporation. In preferred embodiments, the manager server 16 can communicate with any network device in the network 10.

Figure 2:
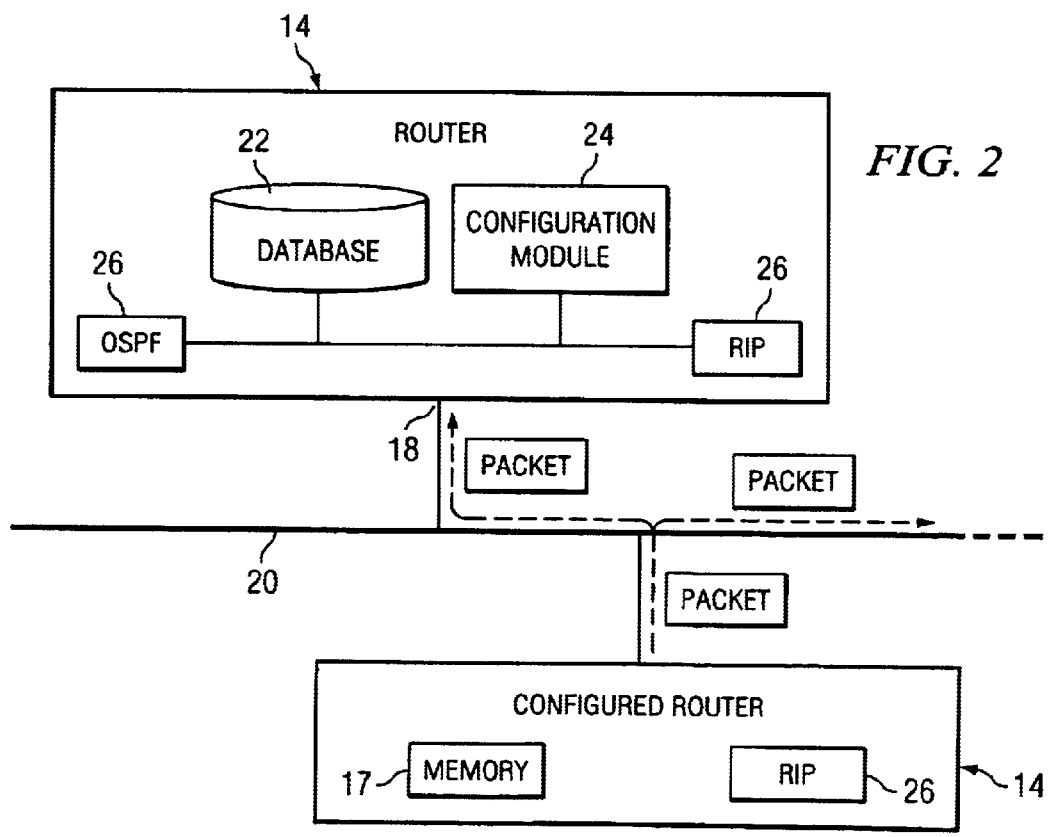
FIG. 2 schematically shows an unconfigured router configured to monitor network traffic transmitted by a configured router.

FIG. 2 schematically shows an unconfigured router 14 having the preferred logic to monitor network traffic transmitted by an already configured router 14. The configured router 14 includes memory 17 for storing configuration data relating to the subnet 12. The unconfigured router 14 preferably includes an interface 18 that couples with the subnet 12, which is transmitting data packets. The data packets may include message data (e.g., data packets), control data (e.g., control packets), or any other type of data transported by packets. In addition, the unconfigured router 14 also includes, among other things, a configuration database 22 for storing configuration data parsed and processed from monitored packets, a configuration module 24 for configuring the given router 14 in accord with the data in the configuration database 22, and a plurality of inter-router protocol modules 26 for communicating with other routers 14. The inter-router protocol modules 26 may support any well known protocol, such as the Routing Information Protocol ("RIP") and the Open Shortest Path First protocol ("OSPF"). Of course, other protocols not shown also may be supported with other protocol modules 26. As shown in the figure, packets are transmitted from the configured router 14 across the bus 20.

FIG. 3 shows a preferred process of configuring a given router 14 that is added to a given subnet 12. In a manner similar to the processes shown in other figures, those skilled in the art should appreciate that various steps in this process can be executed in a different order than that shown. The process preferably is executed each time a new, unconfigured router 14 is to be added to the given subnet 12.

The process begins at step 300 in which the given router 14 passively retrieves configuration data from the given subnet 12. To that end, FIG. 4 shows a preferred process of passively retrieving such data. The process begins at step 400 in which the destination address and port of various packets having configuration data is ascertained in accord with conventional processes. For example, when utilized with the RIP protocol, a multicast address designated to receive control packets is determined from a published source. Accordingly, once this address is determined, an interface and port on the given router 14 are set to be that address and port to receive such packets (step 402). In alternative embodiments, all subnet packets are retrieved. All received packets then are filtered to determine which packets include data for configuring the given router 14 Once received, the packets are parsed, in accord with conventional processes, to determine the configuration data (step 404). The configuration data may be stored in the configuration database 22 for subsequent use in configuring the given router 14. This process of retrieving packets may be referred to herein as "snooping" packets, or as "monitoring" traffic on the given subnet 12.

Retrieved packets include a multitude of useful configuration data that may be utilized to configure the given network device. For example, parsing a packet transmitted in accord with the RIP protocol can produce at least the following information:

which other routers 14 in the subnet 12 are executing RIP;

the version of RIP utilized by the other routers 14; and the ports or interfaces that are coupled to routers 14 executing RIP.

As a further example, parsing a packet transmitted in accord with the OSPF protocol can produce at least the following information:

which other routers 14 in the subnet 12 are executing OSPF; and the ports or interfaces that are coupled to routers 14 executing OSPF;

the Internet Protocol subnet mask for the given subnet 12;

the OSPF area in use by other routers 14; and the OSPF timers in use by the other routers 14.

In a similar manner, packets received from modules 26 executing other protocols, such as DHCP (Dynamic Host Configuration Protocol), VRRP (Virtual Router Redundancy Protocol) MLT (multi-link trunking) and VLAN (virtual local area network) also include relevant configuration data. In the case of a VLAN packet, for example, tags appended or prepended to the packets are parsed to ascertain the relevant configuration data. It should be noted that discussion of specific protocols is by example only and should not be construed as a limitation of preferred embodiments of the invention.

In preferred embodiments, packets are snooped regardless of:

1. The VLAN tag on any given packet;
2. Whether the protocol module 26 on the given router 14 is actually enabled; and
3. The state of the spanning tree on the port.

Returning to step 300 in FIG. 3, it should be noted that some data cannot be retrieved passively. Accordingly, the given router 14 often actively retrieves configuration data from other network devices in the given subnet 12 (step 302). To that end, FIG. 5 shows a preferred process of actively retrieving configuration data. More particularly, the process in FIG. 5 includes two subprocesses executing simultaneously. In alternative embodiments, the two subprocesses execute consecutively. Each subprocess will be discussed below.

The first subprocess in FIG. 5 begins at step 500A in which an advertisement from another router 14 in the given subnet 12 is received by the given router 14. Accordingly, in preferred embodiments, a router 14 transmitting an advertisement is preconfigured to transmit specified data via the advertisement. In preferred embodiments, the information in an advertisement includes, among other things:

VLAN identifiers;
STG (spanning tree group) identifiers;
VLAN/STG associations;
VLAN types;
Subnet mask;
Static mask;
Static default route;
DHCP (dynamic host configuration protocol) server; and
DHCP relay mode.

Upon receipt of an advertisement, the subprocess continues to step 502A in which the data is parsed from the advertisement.

The second subprocess begins at step 500B, in which it is determined if the given router has access to the manager server 16. If determined to have no such access, the subprocess end. Conversely, if determined to have such access, then the process continues to step 502B, in which the server is accessed. To that end, the given router 14 generates a data request message having the Internet Protocol address of each router 14 in its subnet 12. Of course, these Internet Protocol addresses are ascertained by monitoring the subnet traffic in step 300 above. Once generated, the request message is forwarded to the manager server 16.

Upon receipt of the request message, the manager server 16 accesses its memory to ascertain information relating to the subnet routers 14 identified in the request message. In preferred embodiments, the manager server 16 includes a management information base (a "MIB") for storing such information. In alternative embodiments, such information is stored in a conventional database. Once the relevant (configuration) information is retrieved, the manager server 16 generates a reply message that includes the relevant information. The reply message then is transmitted across the network 10 to the given router 14. In preferred embodiments, the given router 14 and manager server 16 communicate by means of the well known Simple Network Management protocol ("SNMP").

returning to step 302 in the process shown in FIG. 3, once the configuration data is actively retrieved, then the process continues to step 304 in which selected data retrieved in either or both of steps 300 and 302 are utilized (i.e., processed in many cases) to determine additional configuration data. Any necessary data may be calculated. For example, the IP address of the given router 14 and subnet mask may be determined. In preferred embodiments, the IP address and subnet mask are determined in a manner described in the above referenced copending U.S. patent application entitled, "SYSTEM, DEVICE, AND METHOD FOR DETERMINING A PROTOCOL ADDRESS AND SUBNET MASK FOR A NETWORK DEVICE IN A COMMUNICATION NETWORK" and identified by U.S. application Ser. No. 09/408,386. As an additional example, the default router 14 for the given router 14 in the given subnet 12 may be designated. In particular, as known by those skilled in the art, a default router 14 is the router 14 through which packets destined for another subnet 12 are transmitted. Some subnets 12, however, may include two or more default routers 14. Accordingly, in preferred embodiments, the given router 14 determines which of the default routers 14 that it is to use. In preferred embodiments, the default router 14 having the shortest route to the given router 14 is designated for the given router 14 in the given subnet 12 since its use is most efficient.

Once the configuration data is parsed and/or generated from all sources (i.e., steps 300, 302, and 304 above), then the process continues to step 306 in which the configuration data is stored in the configuration database 22 on the given router 14. As suggested above, depending upon the type of configuration data, any configuration data could be stored in the configuration database 22 immediately upon receipt, and/or be utilized immediately upon receipt.

The process then continues to step 308 in which the given router 14 is configured with the data in the database 22, thus ending the process. To that end, FIG. 6 shows a preferred process of utilizing the configuration data in the configuration database 22 for configuring the given router 14. This process is executed by a network administrator communicating with the given router 14. In preferred embodiments, the network administrator accesses a command line interface on the given router 14 via a coupled console, or via a Telnet connection from another network device. For additional details of this process, see the above noted copending U.S. patent application entitled "METHODS FOR AUTO-CONFIGURING A ROUTER ON AN IP SUBNET" identified by U.S. application Ser. No. 09/407,915.

The process begins at step 600 in which the network administrator initiates the configuration module 24 to begin configuring the given router 14. Once initiated, the configuration module 24 produces a graphical user interface, or a command line interface, for displaying the configuration data on a display device (step 602). In preferred embodiments, the command line interface is utilized to display configuration data in discrete amounts. For example, the configuration data in the configuration database 22 may be reviewed one datum at a time. When a datum is displayed, the process continues to step 604 in which it is determined if the administrator reviewing the datum accepts the datum. Acceptance of a configuration datum indicates that such datum is to be used to configure the given router 14.

If not accepted, then the datum is not utilized as configuration data and the administrator may manually enter a different configuration datum (step 606). Alternatively, if accepted, then the datum is utilized to configure the given router 14 and the process continues to step 608. The appropriate configuration calls then are made to implement either the accepted configuration datum or the manually entered configuration datum (step 608). Of course, the function calls notify the given router 14 of the specified configuration datum, which is implemented in the given router 14 accordingly. It then is determined at step 610 if an additional datum or additional data is to be examined. The process loops back to step 602 if additional datum or data is to be examined. If none remains, then the process ends.

Instead of utilizing the process in FIG. 6, the given router 14 can automatically configure itself. Specifically, the configuration module 24 in the given router 14 may automatically retrieve the data in the configuration database 22, and then call various well known configuration function calls to configure the given network device. In yet other embodiments, the given router 14 can be manually configured, in accord with conventional processes, by utilizing the data in the configuration database 22.

Preferred embodiments of the invention may be implemented in any conventional computer programming language. For example, preferred embodiments may be implemented in a procedural programming language (e.g., "C") or an object oriented programming language (e.g., "C++" or "JAVA"). Alternative embodiments of the invention may be implemented as preprogrammed hardware elements (e.g., application specific integrated circuits or digital signal processors), or other related components.

Alternative embodiments of the invention also may be implemented as a computer program product for use with a computer system. Such implementation may include a series of computer instructions fixed either on a tangible medium, such as a computer readable media (e.g., a diskette, CD-ROM, ROM, or fixed disk), or transmittable to a computer system via a modem or other interface device, such as a communications adapter connected to a network over a medium. The medium may be either a tangible medium (e.g., optical or analog communications lines) or a medium implemented with wireless techniques (e.g., microwave, infrared or other transmission techniques). The series of computer instructions preferably embodies all or part of the functionality previously described herein with respect to the system. Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies. It is expected that such a computer program product may be distributed as a removable medium with accompanying printed or electronic documentation (e.g., shrink wrapped software), preloaded with a computer system (e.g., on system ROM or fixed disk), or distributed from a server or electronic bulletin board over the network (e.g., the Internet 16 or World Wide Web).

Although various exemplary embodiments of the invention have been disclosed, it should be apparent to those skilled in the art that various changes and modifications can be made that will achieve some of the advantages of the invention without departing from the true scope of the invention. These and other obvious modifications are intended to be covered by the appended claims.

We claim:

1. A method of configuring an unconfigured first network device that is a part of a subnet, the subnet having a second network device, the method comprising:

retrieving packets having configuration data at the unconfigured first network device, the retrieved packets being transmitted by the second network device;

parsing the retrieved packets to ascertain the configuration data;

storing at least a portion of the configuration data parsed from the retrieved packets in a configuration database associated with the unconfigured first network device;

utilizing at least one datum of the configuration data to produce additional configuration data; and storing the additional configuration data in the configuration database, the first network device operating in accord with the data in the configuration database.

2. The method as defined by claim 1 further comprising: configuring the first network device to operate in accord with the data in the configuration database.

3. The method as defined by claim 1 wherein the subnet is a local area network having a plurality of other network devices in addition to the second network device.

4. The method as defined by claim 1 wherein the retrieved packets are transmitted in accord with an inter-router protocol.

5. The method as defined by claim 1 wherein the retrieved packets are control packets.

6. The method as defined by claim 1 wherein the retrieved packets are data packets.

7. The method as defined by claim 1 wherein the retrieved packets have a field with a destination address, the first network device setting an interface to have the destination address.

8. The method as defined by claim 1 wherein the second network device includes memory for storing configuration data.

9. The method as defined by claim 1 wherein the first network device includes an inter-router protocol module, the act of retrieving comprising:

retrieving packets having configuration data relating to the inter-router protocol.

10. The method as defined by claim 1 wherein the subnet is coupled to a network.

11. An apparatus for configuring an unconfigured first network device that is a part of a subnet, the subnet having a second network device, the method comprising:

a monitoring module that monitors subnet traffic, the monitoring module retrieving packets having configuration data at the unconfigured first network device, the retrieved packets being transmitted by the second network device;

a data parser operatively coupled with the monitoring module, the data parser parsing the retrieved packets to ascertain the configuration data;

a processor operatively coupled with the data parser, the processor utilizing at least one datum of the configuration data to produce additional configuration data; and data storage operatively coupled with the data parser, the data storage having a configuration database associated with the unconfigured first network device that stores at least a portion of the configuration data parsed from the retrieved packets, the configuration database also storing the additional configuration data, the first network device operating in accord with the data in the configuration database.

12. The apparatus as defined by claim 11 further comprising:

a configuration module operatively coupled with the configuration database, the configuration module retrieving configuration data and additional configuration data to configure the first network device.

13. The apparatus as defined by claim 11 wherein the subnet is a local area network having a plurality of other network devices in addition to the second network device.

14. The apparatus as defined by claim 11 wherein the retrieved packets are transmitted in accord with an inter-router protocol.

15. The apparatus as defined by claim 11 wherein the retrieved packets are control packets.

16. The apparatus as defined by claim 11 wherein the retrieved packets are data packets.

17. The apparatus as defined by claim 11 wherein the retrieved packets have a field with a destination address, the first network device having an interface that is set to have the destination address.

18. The apparatus as defined by claim 11 wherein the second network device includes memory for storing configuration data.

19. The apparatus as defined by claim 11 further including:
   an inter-router protocol module; and
   a packet retrieving module that retrieves packets having configuration data relating to the inter-router protocol.

20. The apparatus as defined by claim 11 wherein the subnet is coupled to a network.

21. A computer program product for use on a computer system for configuring an unconfigured first network device that is a part of a subnet, the subnet having a second network device, the computer program product comprising a computer usable medium having computer readable program code thereon, the computer readable program code including:
   program code for retrieving packets having configuration data at the unconfigured first network device, the retrieved packets being transmitted by the second network device;
   program code for parsing the retrieved packets to ascertain the configuration data;
   program code for storing at least a portion of the configuration data parsed from the retrieved packets in a configuration database associated with the unconfigured first network device;
   program code for utilizing at least one datum of the configuration data to produce additional configuration data; and
   program code for storing the additional configuration data in the configuration database, the first network device operating in accord with the data in the configuration database.

22. The computer program product as defined by claim 21 further comprising:
   program code for configuring the first network device to operate in accord with the data in the configuration database.

23. The computer program product as defined by claim 21 wherein the subnet is a local area network having a plurality of other network devices in addition to the second network device.

24. The computer program product as defined by claim 21 wherein the retrieved packets are control packets.

25. The computer program product as defined by claim 21 wherein the retrieved packets are data packets.

26. The computer program product as defined by claim 21 wherein the retrieved packets have a field with a destination address, the first network device setting an interface to have the destination address.

27. The computer program product as defined by claim 21 wherein the second network device includes memory for storing configuration data.

28. The computer program product as defined by claim 21 wherein the first network device includes an inter-router protocol module, the program code for retrieving comprising:
   program code for retrieving packets having configuration data relating to the inter-router protocol.

29. The computer program product as defined by claim 21 wherein the subnet is coupled to a network.

30. A method of configuring an unconfigured first network device that is a part of a subnet, the subnet having a second network device, the method comprising:
   retrieving packets having configuration data at the unconfigured first network device, the retrieved packets being transmitted by the second network device;
   parsing the retrieved packets to ascertain the configuration data;
   storing the configuration data in a memory associated with the unconfigured first network device:
   utilizing at least one datum of the configuration data to produce additional configuration data; and
   utilizing the configuration data and additional configuration data to control the operation of the first network device.

31. The method as defined by claim 30 further comprising:
   storing the configuration data and additional configuration data in a configuration database.

32. The method as defined by claim 30 wherein the retrieved packets are at least one of control packets and data packets.

33. The method as defined by claim 30 wherein the retrieved packets have a field with a destination address, the first network setting an interface to have the destination address.

34. A computer program product for use on a computer system for configuring an unconfigured first network device that is a part of a subnet, the subnet having a second network device, the computer program product comprising a computer usable medium having computer readable program code thereon, the computer readable program code including:
   program code for retrieving packets having configuration data at the unconfigured first network device, the retrieved packets being transmitted by the second network device;
   program code for parsing the retrieved packets to ascertain the configuration data;
   program code for storing the configuration data in a memory associated with the unconfigured first network device;
   program code for utilizing at least one datum of the configuration data to produce additional configuration data; and
   program code for utilizing the configuration data and additional configuration data to control the operation of the first network device.

35. The computer program product as defined by claim 34 further comprising:
   storing the configuration data and additional configuration data in a configuration database.

36. The computer program product as defined by claim 34 wherein the retrieved packets are at least one of control packets and data packets.

37. The computer program product as defined by claim 34 wherein the retrieved packets have a field with a destination address, the first network setting an interface to have the destination address.

38. The computer program product as defined by claim 34 further comprising:
   program code for actively retrieving configuration data.

39. A method of configuring an unconfigured first network device that is a part of a subnet, the subnet having a second network device, the method comprising:
   the second network device transmitting packets having configuration data;
   monitoring packet traffic in the subnet;

retrieving packets monitored in the subnet at the unconfigured first network device;

parsing the retrieved packets to ascertain the configuration data;

storing at least a portion of the configuration data parsed from the retrieved packets in a configuration database associated with the unconfigured first network device;

utilizing at least one datum of the configuration data to produce additional configuration data; and storing the additional configuration data in the configuration database, the first network device operating in accord with the data in the configuration database.

* * * * *